United States Patent [19]

Seliga

[11] Patent Number: 4,671,124
[45] Date of Patent: Jun. 9, 1987

[54] LOAD MONITOR FOR CYCLIC MACHINE
[75] Inventor: Gerald W. Seliga, Frankfort, Ill.
[73] Assignee: Productronix, Inc., Oak Forest, Ill.
[21] Appl. No.: 847,914
[22] Filed: Apr. 3, 1986
[51] Int. Cl.[4] .............................................. G01D 1/12
[52] U.S. Cl. .................................... 73/862.53; 73/770
[58] Field of Search ............ 73/764, 770, 808, 862.53, 73/862.67; 100/50, 99; 340/665, 679, 680

[56] References Cited
U.S. PATENT DOCUMENTS

| | | |
|---|---|---|
| 4,048,848 | 9/1977 | Dybel . |
| 4,088,899 | 5/1978 | Miller et al. ...................... 340/680 X |
| 4,116,050 | 9/1978 | Tanahashi et al. ................ 100/99 X |
| 4,171,646 | 10/1979 | Dybel et al. . |
| 4,195,563 | 4/1980 | Budraitis et al. . |
| 4,274,282 | 6/1981 | Budraitis et al. . |
| 4,461,182 | 7/1984 | Jones et al. ........................ 73/770 X |

FOREIGN PATENT DOCUMENTS 0130627 10/1981 Japan ................................ 73/862.53

Primary Examiner—Charles A. Ruehl
Attorney, Agent, or Firm—Wood, Dalton, Phillips, Mason & Rowe

[57] ABSTRACT

A load monitor for a cyclic machine has a peak load signal detector the output of which is displayed indefinitely on an analog meter. On each cycle of the machine, the analog load signal is converted to a digital signal and the digital signal is converted to an analog signal connected with the analog meter. Overload and underload reference signals are established during a selected single cycle of machine operation.

17 Claims, 4 Drawing Figures

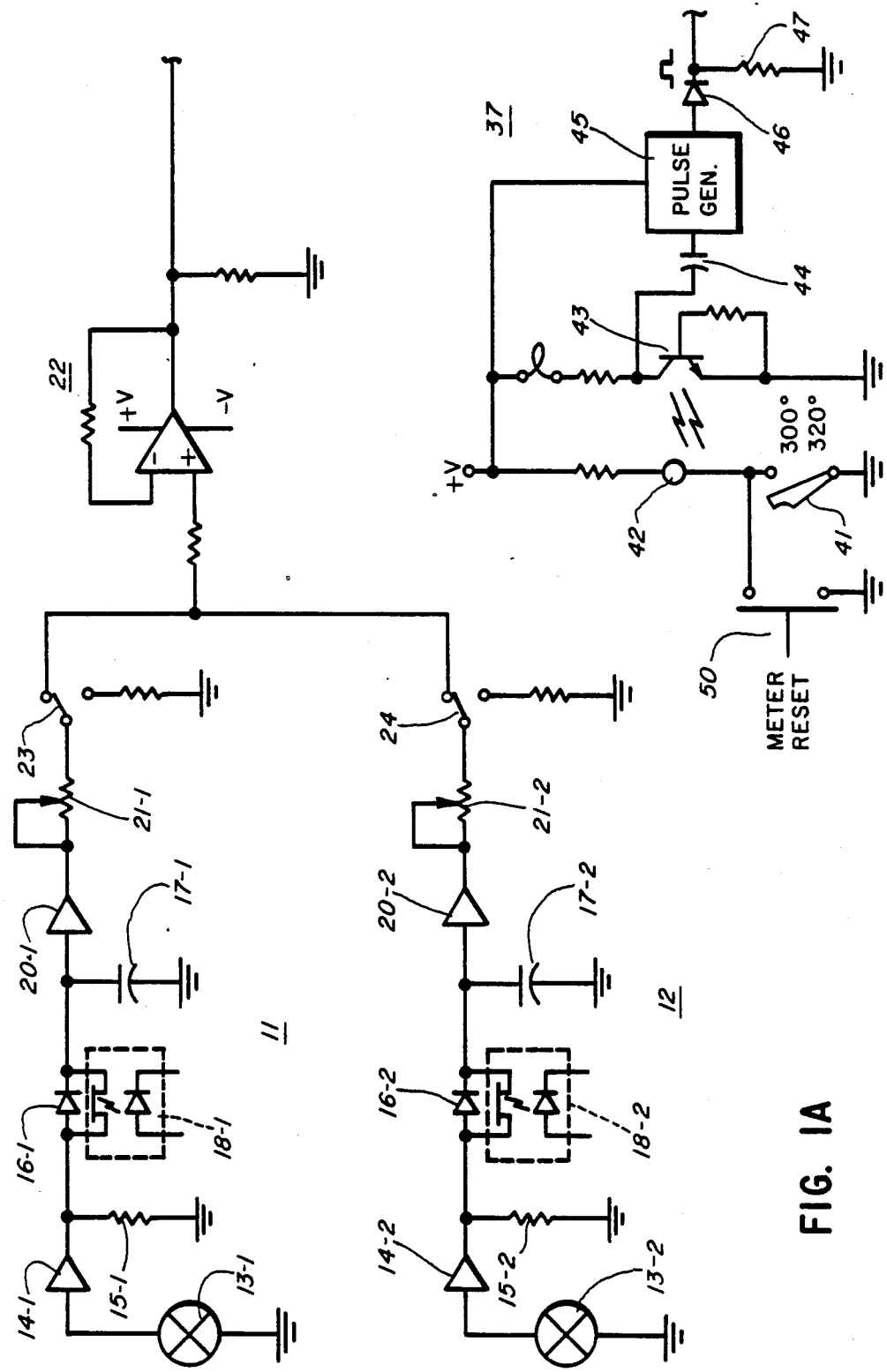
FIG. IA

LOAD MONITOR FOR CYCLIC MACHINE

FIELD OF THE INVENTION

This invention relates to a load display for a machine load monitor and to a reference signal circuit for the load limit comparator of a load monitor.

BACKGROUND OF THE INVENTION

Budraitis and Seliga U.S. Pat. Nos. 4,195,563 and 4,274,282 show a load monitor with a load limit comparator and a load indicating meter which may be either an analog meter or a digital meter. Upon occurrence of an overload the machine is stopped and the meter indicates the load to which the machine was subjected. The peak load detector is an analog circuit utilizing a capacitor which is charged to the peak signal value. The charge on the capacitor decays over a period of time. With an analog meter, the reading becomes progressively inaccurate. A digital meter may be used and latched on occurrence of an overload so that the peak overload is indicated indefinitely. However, many operators find analog meters easier to read accurately than digital meters.

The load limit circuits of the Budraitis and Seliga patents have comparators which compare the load experienced during each cycle of the machine with reference signals. Typically, the reference is set by an operator adjusted potentiometer.

The load on a machine depends on the nature of the tooling and material. In setting up a machine for manufacture of a part, experience and care are required to select the load limits and to adjust the limit potentiometers properly. If the overload reference is set too low, the machine will shut down unnecessarily. If it is set too high, the tooling and machine may be damaged. Conversely, if the low load comparator is set too low, the machine may continue to run without stock or with a broken tool and if it is set too high, operation may be interrupted unnecessarily.

Dybel et al. U.S. Pat. No. 4,171,646 shows a monitor which establishes a load limit comparator reference after several cycles of machine operation and which changes the reference as the machine operates. A machine utilizing this control must be watched carefully as if the tooling dulls or the stock changes character slowly, the load limit will change and the machine continue to operate until the absolute overload circuit is actuated. The tooling or machine may be damaged or unusable product may be produced.

SUMMARY OF THE INVENTION

The load monitor disclosed herein obviates the problems noted above.

One feature of the invention is that the load monitor has a peak load indicator circuit including an analog to digital converter connected with the output of the peak detector circuit, means responsive to the cyclical operation of the machine for actuating the analog to digital converter on each machine cycle to convert the analog peak load output of the peak detector to a digital output signal, a ditigal to analog converter which converts the digital output signal to an analog signal, and an analog meter which displays the peak load for each successive machine operation. If the machine stops, as from an overload, the overload indication is displayed indefinitely.

Another feature of the invention is that the analog to digital converter is actuated before an appreciable decay of the analog output of the peak detector circuit and that the peak detector is reset on each cycle of operation of the machine.

A further feature of the invention is that the load monitor has a load limit comparator and that a load limit reference circuit is connected between the output of the peak detector and the comparator for establishing a reference signal which is a function of the peak load during a selected single cycle of machine operation. The reference circuit preferably includes a latch and hold circuit responsive to the output of the peak detector.

Load limits are provided for both overload and underload and the reference signal circuit includes means for summing offset signals with the overload and underload reference signals.

Further features of the invention will readily be apparent from the following specification and from the drawings, in which:

FIGS. 1A and 1B are a simplified schematic of a load monitor with an indefinite hold analog meter circuit;

The monitors may be used with many types of reciprocating machines which exert a force during the machine cycle. Examples include punch presses, forming presses, drill presses, plastic molding machines. Other machines for which the monitor is suitable will be apparent to those skilled in the art.

A load monitor is often used on each of a plurality of machines with automatic material feed. One operator supervises several machines. With an analog meter display having the indefinite hold feature of this invention, the operator can readily determine the load condition of each machine.

A cyclic reciprocating machine typically has a tool which is reciprocated, as by a rotary crank, to form or cut a part from stock material. The machine operation and tool position are conveniently defined in terms of crankshaft rotation angle. Zero degrees represents full retraction of the tool. The tool is fully extended and the machine subjected to maximum load at about 180°. If an overload occurs, a clutch between the drive motor and crank disengages and the machine stops.

Each machine has one or more frame members which carry the load. A strain sensor, as the piezoelectric element shown in Budraitis U.S. Pat. No. 3,858,440, is mounted on each of the frame members and provides a load signal to the monitor as the machine operates through its cycle. Other types of strain sensors may be used, as for example resistance sensors.

Figure 1B:
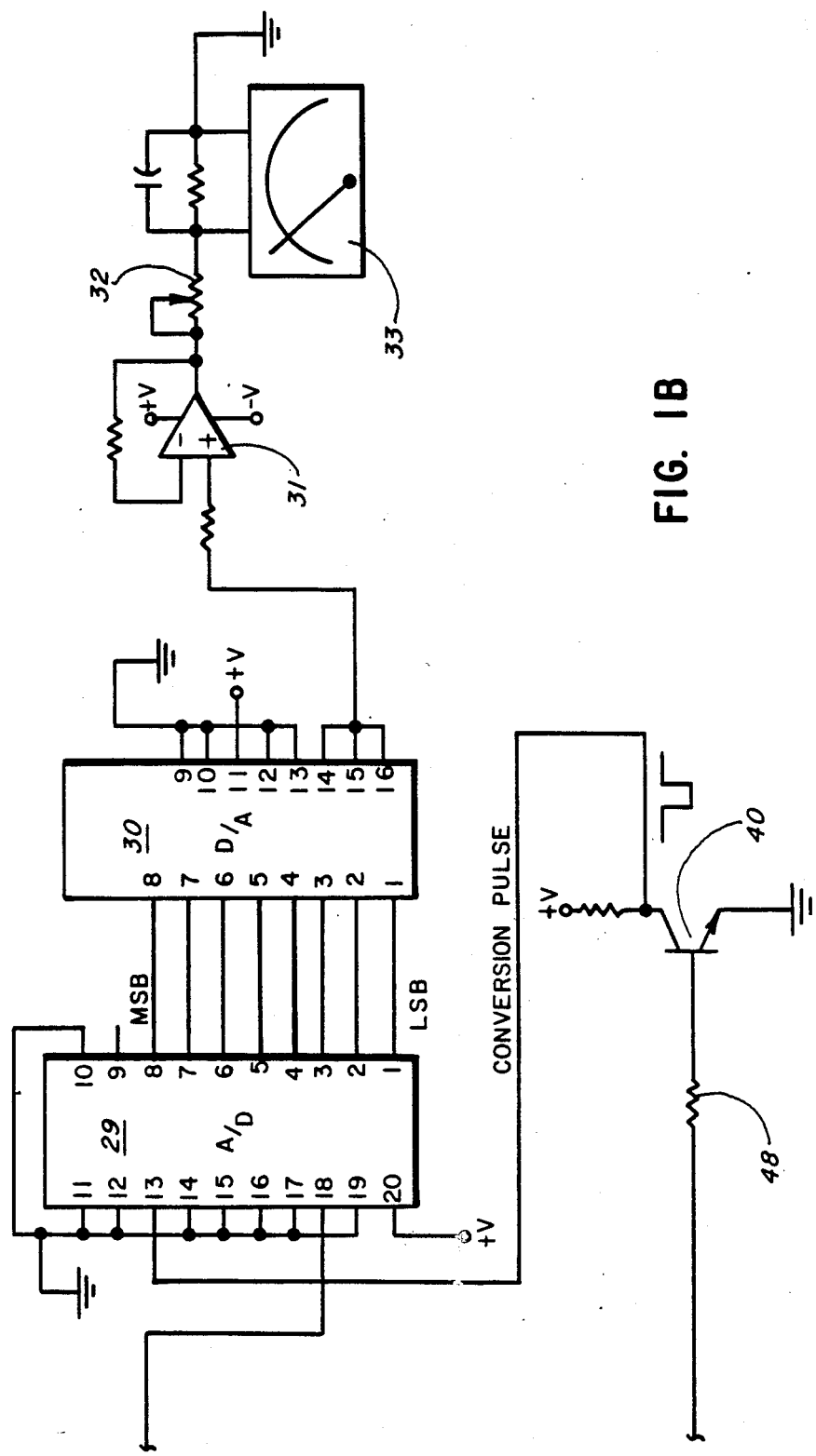

A monitor with two identical load channels 11, 12 is shown in FIG. 1A, for use with a machine having two frame members. The elements of the two channels are indentified by the suffix -1 for channel 11 and -2 for channel 12. The monitor for a machine with a single frame member has one channel. The monitor for machines with more than two frame members has additional channels for each frame member.

The piezoelectric load sensor 13 is connected with an amplifier 14. The output of amplifier 14 is developed across load resistor 15. Series connected diode 16 and shunt capacitor 17 form a peak detector circuit. The capacitor 17 charges to a voltage representing the peak voltage from sensor 13 and thus the maximum load on the machine. An optically coupled circuit 18 shunts diode 16 and is actuated at the end of each cycle of operation to discharge capacitor 17 through resistor 15.

The peak load signal across capacitor 17 is coupled through amplifier 20 and adjustable gain potentiometer 21 to a summing amplifier 22 with load selector switches 23, 24 closed as shown. The load signals from channels 11 and 12 are summed at the input of amplifier 22 and the amplifier output represents the total load on the machine. The load signal output of amplifier 22 is connected with the analog signal input of an analog to digital converter 29, the operation of which is synchronized with machine operation, as explained below. The digital output of the analog to digital converter is connected with a digital to analog converter 30 which has an analog output connected with amplifier 31 and through meter gain control potentiometer 32 with an analog meter 33. The meter may, for example, be calibrated in tons and indicates directly the load on the machine during the most recent machine cycle.

The analog to digital converter 29 may be an integrated circuit, Analog Devices type AD670. The digital to analog converter may be a complementary integrated circuit type AD558. The numbers inside the converter blocks indicate the pin connections for these circuits. Other converters could be used.

In the analog to digital converter the incoming analog data is connected with pin 18. The multi-bit digital output is derived in parallel fashion from pins 1–8. Control functions CE and CS, pins 15 and 14, are grounded and the converter operates in a stand-alone mode. Data conversion is initiated by bringing R/W pin 13 low. The data is read at the output pins 1–8 when the conversion is complete and R/W is again high. The analog output of digital to analog converter 30 always represents the digital input information at pins 1–8.

The conversion control circuit 37 is actuated in synchronism with machine operation. R/W pin 13 is connected with the collector of transistor 40 which is normally nonconducting and the pin is thus at a high potential. During the machine cycle when the crankshaft reaches an angle of the order of 300°, cam switch 41 closes connecting lamp 42 across the voltage supply and causing photo transistor 43 to conduct. Cam switch 41 opens after 20° rotation of the crankshaft and transistor 43 is again cut off. The negative pulse at the collector of transistor 43 is coupled through capacitor 44 with an input of pulse generator 45. The output of pulse generator 45 is a positive pulse connected through diode 46 across shunt resistor 47 and through series resistor 48 to the base transistor 40. The positive pulse causes transistor 40 to conduct applying a negative pulse to R/W pin 13 of the analog to digital converter 29. This pulse has a duration of the order of 10 microseconds. Data conversion begins with the positive to negative transition at pin 13 and the pin returns to a high state before the conversion is comtemplated. Upon completion of the conversion, the data is read at output pins 1–8. The digital data is converted to an analog signal which is displayed by meter 33.

In a cycle of operation of the machine, the tooling performs its function and the machine frame is subjected to its maximum load. The peak detector capacitors 17-1 and 17-2 are charged and the sum of these signals is applied to pin 18 of analog to digital converter 29. Switch 41 closes generating the conversion pulse for the analog to digital converter. The conversion is carried out and the digital data coupled to digital to analog converter, the output of which is displayed on meter 33. Circuits 18-1 and 18-2 are actuated, as by another cam switch (not shown) to discharge the peak detector capacitors at about 320° of machine operation in readiness for the succeeding machine cycle. This does not affect the reading of analog meter 33.

The operator can by manipulation of switches 23 and 24 measure the individual loads on the machine members to determine whether the machine is properly balanced. If the machine is stopped, meter 33 can be reset by closing switch 50 which actuates pulse generator 45 and causes analog to digital convetrer to convert without an analog input signal.

In the event the machine is stopped because of an overload, stopping occurs after cam switch 41 closes. Meter 33 indicates the maximum load incurred by the machine and maintains this indication indefinitely.

Figure 2:
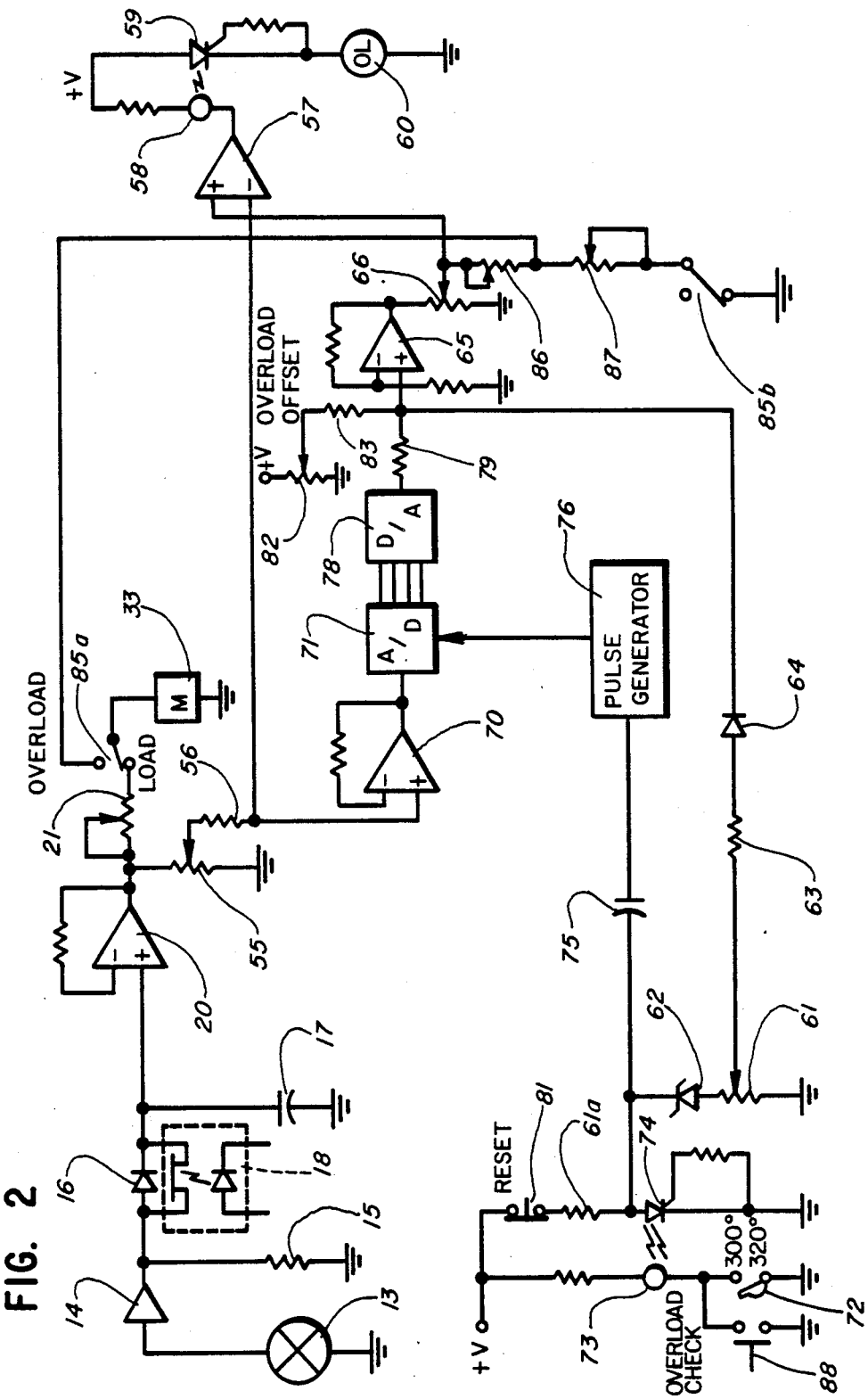
FIG. 2 is a simplified schematic of a load monitor with an overload limit and a load limit reference circuit based on the load experienced by the machine during a single cycle of operation.

A load monitor with an overload limit circuit is shown in FIG. 2. Circuit elements common with FIG. 1 are identified with the same reference numerals, and will not be described in detail. The load signal from amplifier 20 is connected through gain potentiometer 55, used in setting the overload circuit, and series isolation resistor 56 with the inverting input of overload comparator 57. A reference potential (described below) is connected with the noninverting input of comparator 57. So long as the load signal at the inverting input of comparator 57 is less than the reference potential, the output of the comparator is high and the machine will operate. If an overload occurs, the load signal at the inverting input exceeds the reference and the output of comparator 57 goes low. Lamp 58 is energized firing opto SCR 59 and energizing overload relay 60. The machine is stopped and suitable audible or visual alarms are given.

The overload reference is established in accordance with the invention by the peak load incurred during a single selected cycle of the machine. The operator can observe the machine during this cycle to insure that it is properly functioning and that the load incurred is a reasonable representation of the loads which should occur in subsequent use.

An overload reference for the initial cycle is provided by a potentiometer 61 connected across the voltage source through a current limiting resistor 61a and a Zener voltage regulator 62. The instrument manufacturer sets potentiometer 61 for a voltage that represents a suitable maximum load and which is connected through resistor 63 and diode 64 with overload reference amplifier 65. The output of amplifier 65 is developed across an overload gain potentiometer 66 and connected with the noninverting input of overload comparator 57.

During the initial machine cycle, as the maximum load occurs, peak detector capacitor 17 charges. The load signal is connected through amplifier 20, potentiometer 55 and amplifier 70 to the analog input of analog to digital converter 71 which may be the converter described above. After the press passes the maximum load point, cam switch 72 closes at about 300° of crankshaft rotation. Lamp 73 lights firing opto SCR 74. A negative pulse is coupled through capacitor 75 to pulse generator 76 which generates a negative pulse connected with the R/W control pin of analog to digital converter 71. The signal from peak detector capacitor 17 is converted to digital form and coupled to the digital input of digital to analog converter 78, as described above. The analog output of digital to analog converter 78 is connected through resistor 79 with the input of reference amplifier 65. The reference for overload comparator 57 is now based on the load incurred during the single selected cycle of machine operation.

Opto SCR 74 continues to conduct so long as reset switch 81 is not opened. This grounds the Zener diode 62 and inhibits the operation of the preset reference signal circuit. So long as opto SCR 74 conducts, pulse generator 76 is inoperative and the analog to digital converter 71 continues to hold the signal from the initial single machine cycle.

The overload reference is preferably augmented by an offset signal from potentiometer 82. The potentiometer is set by the instrument manufacturer and the potential connected through resistor 83 with the input of amplifier 65 where it is summed with the analog signal from digital to analog converter 78. The offset will typically be a percentage, as 10%, of the load incurred during the initial machine cycle. The circuit of meter 33 is provided with a double pole, double throw switch 85a, 85b which enables the operator to display the overload reference on the meter. Following the initial cycle of machine operation and with overload offset potentiometer 82 set at ground or 0, the overload reference at potentiometer 66 is displayed by operating the switch to the overload position. The instrument manufacturer then adjusts potentiometer 82 to add the desired overload offset.

Potentiometer 86 provides for calibration of the overload reference reading. Potentiometer 87 represents the impedance of meter 33 so that the reference circuit is not disturbed in switching between load and overload measurements.

The overload reference circuit may be reset by opening switch 81 which turns off opto SCR 74. On the next cycle of the machine, the peak load voltage will be converted and connected with amplifier 65 as described above.

The operation of the overload circuit is checked by first pushing the reset switch 81 and then the overload switch 88, without the machine operating. This causes the analog to digital converter 71 to cycle without an input signal and inhibits the initial overload reference from potentiometer 61. Then the machine may be cycled without an overload reference signal. A load of any magnitude will cause the output of comparator 57 to go low and trigger the overload circuit.

Figure 3:
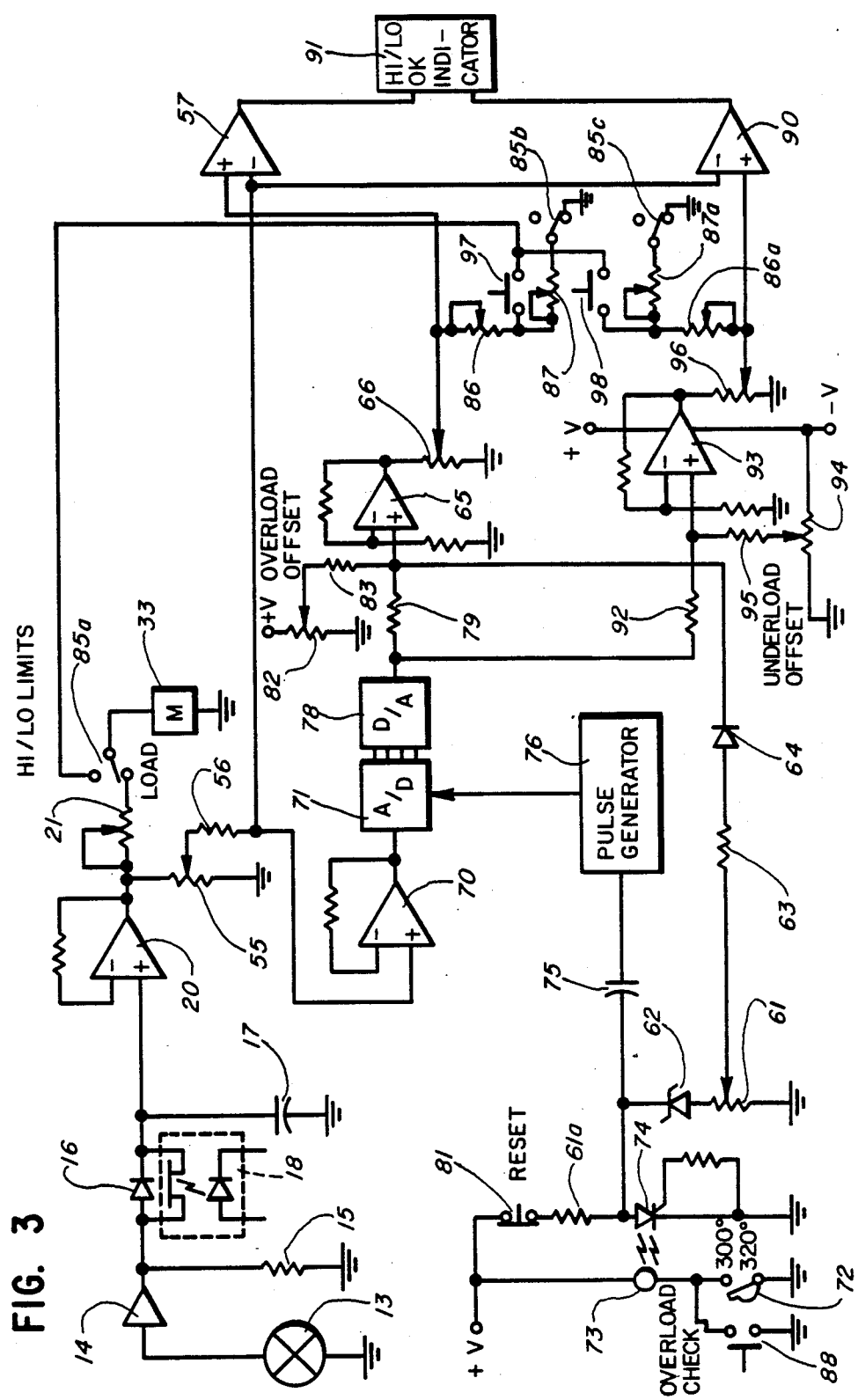
FIG. 3 is a simplified schematic of a load monitor with overload and underload limits.

The circuit of FIG. 3 extends the load limit reference circuit of FIG. 2 to a monitor having both overload and underload comparators as in Budraitis and Seliga U.S. Pat. No. 4,274,282. Circuit elements previously described will be identified by the same reference numerals and the detailed description of the circuit and its operation will not be repeated.

Overload comparators 57 and underload comparator 90 have outputs connected with a High/Low/OK indicator 91 which may be of the character described in the Budraitis and Seliga patent. The overload comparator circuit and operation are as in FIG. 2.

The underload comparator 90 has its inverting input connected with the load signal from amplifier 20 and potentiometer 55. The noninverting input is connected with an underload reference circuit. As in the Budraitis and Seliga patent, so long as the load on each cycle of the machine exceeds the underload reference, the machine is operating properly and an underload shutdown does not occur. If there is a failure of the stock feed, a broken tool or some other condition with which the peak load does not reach the underload reference, a low load failure occurs, the machine is stopped and an appropriate indication is given.

The low load reference signal is derived from the output of digital to analog converter 78. The analog output signal is connected through resistor 92 with the noninverting input of summing amplifier 93. An underload offset potential is derived from potentiometer 94 which is connected from the negative voltage supply to ground. This signal is connected through resistor 95 to the input of amplifier 93 and is subtracted from the reference load signal from digital to analog converter 78. The output of amplifier 93 is coupled through gain potentiometer 96 to the noninverting input of comparator 90. In the case of the underload comparator, the offset potential is subtracted from the load signal during the initial cycle of the machine so that a slight variation in operating conditions will not cause an unwarranted stoppage.

The overload and underload reference signals can be displayed on meter 33 by operating three section switch 85a-c to the High/Low limit position. Potentiometers 86a and 87a set the meter gain and substitute for the meter impedance in the underload reference signal circuit. Switches 97 and 98 are actuated to display either the overload or the underload reference signal, respectively.

With the load limit reference signal circuits of FIGS. 2 and 3, the monitor is initially set accurately and with little chance for error. If conditions change, as when the tooling dulls or stock characteristics vary, the load limit references can readily be reset. However, the reference values do not change without the operator's knowledge as in Dybel et al. U.S. Pat. No. 4,171,646.

I claim:

1. In a load monitor for a cyclically operating machine, the monitor including a load sensor mounted on the machine, the sensor having an analog output representing machine load, a peak detector circuit connected with said load sensor and having an analog output representing peak load for each cycle of machine operation, the peak detector output having a finite time constant, a peak load indicator circuit comprising:
    an analog to digital converter connected with the output of said peak detector;
    means responsive to the cyclical operation of said machine for actuating said analog to digital converter on each cycle of the machine to convert the analog peak load output of the peak detector to a digital output signal;
    a digital to analog converter connected with the output of said analog to digital converter to convert the digital output signal to an analog signal; and
    an analog meter connected with the output of said digital to analog converter and indicating the peak load for each successive machine operation and for maintaining the indication indefinitely if the machine stops.

2. The load indicator of claim 1 in which said analog to digital converter is actuated before significant decay of the analog output of the peak detector circuit.

3. The peak load indicator of claim 2 in which the machine has a 360° cycle of operation with peak load occurring at about 180° and actuation of the analog to digital converter occurring at about 300°.

4. The peak load indicator of claim 2 in which the machine has a 360° cycle of operation with peak load occurring at about 180°, actuation of the analog to digital converter occurring at about 300° and means responsive to the cyclical operation of the machine to reset the peak detector on each cycle of the machine at about 320°.

5. The peak load indicator of claim 1 including means responsive to the cyclical operation of the machine to reset the peak detector on each cycle of the machine.

6. The peak load indicator circuit of claim 1 in which said analog to digital converter has a multi-bit output, said digital to analog converter has a multi-bit input and including a parallel connection between the analog to digital converter output and the digital to analog converter input.

7. In a load monitor for a cyclically operating machine, the monitor including a load sensor mounted on the machine, the sensor having an analog output responsive to machine load, a peak detector circuit connected with said load sensor and having an analog output representing the load for each cycle of machine operation, a load limit comparator having one input connected with the output of the peak detector circuit and the other input connected with a reference and a load limit indicator connected with the output of the comparator, a load limit reference circuit, comprising:

a circuit connected between the output of the peak detector and said other comparator input for establishing a reference signal which is a function of the peak machine load during a selected single cycle of the machine.

8. The load limit reference circuit of claim 7 including a latch and hold circuit responsive to the output of the peak detector for latching and holding a signal representing the analog peak load signal corresponding with the peak load on the machine during the selected machine cycle.

9. The load limit reference circuit of claim 8 in which said latch and hold circuit includes:

an analog to digital converter connected with the output of said peak detector;

means representative to a cycle of operation of the machine for actuating said analog to digital converter to convert the analog peak load output of the peak detector to a digital signal; and a digital to analog converter connected with the output of the analog to digital converter to convert the digital signal to an analog signal which is connected with the other input of said load limit comparator.

10. The load limit reference circuit of claim 7 in which said comparator is an overload limit and the load limit indicator is actuated when the peak load analog output signal exceeds the reference signal.

11. The load limit reference circuit of claim 10 including a means operative during said selected cycle of the machine to apply a preset reference signal to said comparator; and means responsive to said selected cycle of the machine to inhibit the preset reference.

12. The load limit reference circuit of claim 11 including a reset circuit to disable said inhibit means.

13. The load limit reference circuit of claim 7 in which said comparator is an underload limit and the load limit indicator is actuated when the peak load analog output signal fails to exceed the reference signal during a machine cycle.

14. The load limit reference circuit of claim 7 including means for summing an offset signal with said reference signal.

15. The load limit reference circuit of claim 14 for an overload limit comparator where said offset signal is added to said reference signal.

16. The load limit reference circuit of claim 14 for an underload limit comparator where said offset signal is subtracted from said reference signal.

17. The load limit reference circuit of claim 7 in which said monitor includes a meter and said reference circuit includes a switch for displaying the load limit reference on said meter.

* * * * *